United States Patent
Li et al.

(10) Patent No.: US 10,045,172 B2
(45) Date of Patent: Aug. 7, 2018

(54) INFORMATION SENDING METHOD, NETWORK DEVICE, AND TERMINAL

(71) Applicant: Huawei Technologies Co., Ltd., Shenzhen (CN)

(72) Inventors: Shanfu Li, Shenzhen (CN); Kangmin Huang, Shenzhen (CN); Maosheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 14/692,351

(22) Filed: Apr. 21, 2015

(65) Prior Publication Data
US 2015/0312740 A1 Oct. 29, 2015

(30) Foreign Application Priority Data
Apr. 23, 2014 (CN) .......................... 2014 1 0165238

(51) Int. Cl.
H04W 4/22 (2009.01)
H04W 4/90 (2018.01)

(52) U.S. Cl.
CPC ............... *H04W 4/22* (2013.01); *H04W 4/90* (2018.02)

(58) Field of Classification Search
CPC .............................. H04W 4/22; H04W 76/007
USPC .................... 455/404.1, 404.2, 450
See application file for complete search history.

(56) References Cited

U.S. PATENT DOCUMENTS

| 2002/0072939 A1* | 6/2002 | Kawaberi ............. G06Q 10/02 705/5 |
| 2005/0239477 A1 | 10/2005 | Kim et al. |
| 2007/0049259 A1* | 3/2007 | Onishi ................. A62B 99/00 455/414.2 |

(Continued)

FOREIGN PATENT DOCUMENTS

| CN | 1360430 A | 7/2002 |
| CN | 1675952 A | 9/2005 |

(Continued)

OTHER PUBLICATIONS

Foreign Communication From a Counterpart Application, Chinese Application No. 201410165238.X, Chinese Office Action dated Oct. 31, 2016, 10 pages.
Partial English Translation and Abstract of Chinese Patent Application No. CN103200524A, Jun. 29, 2015, 10 pages.
Partial English Translation and Abstract of Chinese Patent Application No. CN102946406A, Apr. 24, 2015, 2 pages.

(Continued)

*Primary Examiner* — Kamran Afshar
*Assistant Examiner* — Farideh Madani
(74) *Attorney, Agent, or Firm* — Conley Rose, P.C.

(57) ABSTRACT

An information sending method, where the method includes receiving, by a first network device, alarm information sent by an alarm terminal; and after confirming the alarm information, generating, by the first network device, first guide information according to the alarm information, and sending the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold. The present invention further discloses a corresponding network device and terminal.

11 Claims, 5 Drawing Sheets

(56) References Cited

U.S. PATENT DOCUMENTS

| | | | |
|---|---|---|---|
| 2008/0197999 A1* | 8/2008 | Henderson | G08B 17/125 340/521 |
| 2009/0132673 A1* | 5/2009 | Sprigg | G08G 1/0104 709/207 |
| 2013/0091452 A1* | 4/2013 | Sorden | G06F 3/048 715/771 |
| 2013/0172017 A1 | 7/2013 | Wang | |
| 2015/0172896 A1* | 6/2015 | Van Phan | H04W 4/22 455/404.1 |
| 2015/0279198 A1* | 10/2015 | Gu | G08B 13/19656 340/541 |

FOREIGN PATENT DOCUMENTS

| | | |
|---|---|---|
| CN | 101227650 A | 7/2008 |
| CN | 102740218 A | 10/2012 |
| CN | 102884816 A | 1/2013 |
| CN | 102946406 A | 2/2013 |
| CN | 103002399 A | 3/2013 |
| CN | 103200524 A | 7/2013 |
| CN | 103945344 A | 7/2014 |
| WO | 2004016030 A1 | 2/2004 |

OTHER PUBLICATIONS

Partial English Translation and Abstract of Chinese Patent Application No. CN103945344A, Apr. 24, 2015, 4 pages.

Partial English Translation and Abstract of Chinese Patent Application No. CN102740218A, Part 1, Apr. 24, 2015, 7 pages.

Partial English Translation and Abstract of Chinese Patent Application No. CN102740218A, Part 2, Apr. 24, 2015, 3 pages.

Foreign Communication From a Counterpart Application, PCT Application PCT/CN2014/090168, International Search Report dated Feb. 9, 2015, 10 pages.

Foreign Communication From a Counterpart Application, PCT Application PCT/CN2014/090168, Written Opinion dated Feb. 9, 2015, 7 pages.

Machine Translation and Abstract of Chinese Publication No. CN1360430, Jul. 24, 2002, 6 pages.

Machine Translation and Abstract of Chinese Publication No. CN101227650, Jul. 23, 2008, 12 pages.

Foreign Communication From a Counterpart Application, Chinese Application No. 201410165238.X, Chinese Office Action dated May 27, 2017, 9 pages.

\* cited by examiner

```
                                                             101
┌─────────────────────────────────────────────────────────┐ /
│  A first network device receives alarm information sent by an alarm │
│                         terminal                        │
└─────────────────────────────────────────────────────────┘
                              │
                              ▼
┌─────────────────────────────────────────────────────────┐
│   After confirming the alarm information, the first network device │
│ generates first guide information according to the alarm information, and │
│    sends the first guide information to a target terminal, so that the target │  102
│  terminal can respond to the alarm information according to the first guide │ /
│    information, where the target terminal is a terminal determined among │
│   terminals that are within same base-station signal coverage in which the │
│    alarm terminal is located, or the target terminal is a terminal determined │
│   among terminals whose distances from the alarm terminal are less than a │
│                         threshold                       │
└─────────────────────────────────────────────────────────┘
```

FIG. 1

```
                                                                    201
┌────────────────────────────────────────────────────────────────┐ /
│  A first network device receives alarm information sent by an alarm terminal │
└────────────────────────────────────────────────────────────────┘
                                 │
                                 ▼
┌────────────────────────────────────────────────────────────────┐
│ After confirming the alarm information, the first network device generates first │
│   guide information according to the alarm information, sends the first guide │
│     information to a second network device, and sends, by using the second │
│  network device, to a target terminal second guide information that relates to the │  202
│        first guide information, where the target terminal is: a terminal that is │ /
│   determined, by the second network device according to location information of │
│   the alarm terminal and the second guide information, among terminals that are │
│  within same base-station signal coverage in which the alarm terminal is located, │
│       or, a terminal that is determined, by the second network device according to │
│    location information of the alarm terminal and the second guide information, │
│     among terminals whose distances from the alarm terminal are less than the │
│                              threshold                         │
└────────────────────────────────────────────────────────────────┘
```

FIG. 2

INFORMATION SENDING METHOD, NETWORK DEVICE, AND TERMINAL

CROSS-REFERENCE TO RELATED APPLICATIONS

This application claims priority to Chinese Patent Application No. 201410165238.X, filed on Apr. 23, 2014, which is hereby incorporated by reference in its entirety.

TECHNICAL FIELD

The present invention relates to the communications field, and in particular, to an information sending method, a network device, and a terminal.

BACKGROUND

When help is needed in an emergency, generally, a help seeker contacts a 110 alarm center by phone, and then, the police arrive at the site of the emergency for rescue. A problem of help seeking in this way is that it may be a relatively long time from the reporting to the arrival of the police at the site, and therefore, the best opportunity for rescue is easily missed.

In the prior art, some help-seeking methods are also provided.

For example, a help-seeking method is that a mobile phone with a calling-for-help function is provided and includes a toggle key that is configured to trigger a calling-for-help system; the toggle key is connected to a general-purpose input/output (GPIO) interface of a central processing unit (CPU) of the mobile phone; and after the CPU of the mobile phone receives a trigger signal, positioning is performed using an Assisted Global Positioning System/Global Positioning System (AGPS/GPS) chip of the mobile phone, and collected location information is sent by the CPU of the mobile phone to a mobile phone with a preset phone number.

In this method, after a user triggers help seeking using the toggle key, the mobile phone sends the location information of the user to the mobile phone with the preset phone number. However, if the mobile phone with the preset phone number is not started, or when the mobile phone with the preset phone number is relatively far from the help seeker, even though help-seeking information including a location is sent, the help seeker cannot get help in time.

For example, another help-seeking method is that WeChat software is installed in a mobile phone, and when a user shakes the mobile phone, the WeChat software uploads a mobile number, base station information, and GPS information of the user to a server; and the server immediately calculates information that other users shake mobile phones, which is received within N seconds before a request that the user shakes the mobile phone is received, and performs matching according to distances, and then returns a result to the user. Specific steps are as follows.

1. Implement a shake function, where an acceleration sensor is used. When the acceleration sensor detects that the mobile phone of the user is shaking, a request is sent to a nearby mobile phone base station.

2. A nearby mobile phone base station with the best signal quality receives the request of the user, and generally a distance between the base station and the mobile phone of the user ranges from 50 to 100 meters. For example, a serial number of the base station is W203000, where all mobile phone base stations are uniquely numbered; and a physical address of a location of the mobile phone base station may be found out according to the serial number of the base station.

3. The mobile phone base station uses its location as a current location of the user, and sends the location to a WeChat background server.

4. If detecting that multiple persons are at a same location, the WeChat background server pushes to the user persons nearby.

However, WeChat is a social chat tool, and is only used to push other persons nearby to a user. When needing help, the user still needs to contact the persons nearby one by one. The method is not an automatic help-seeking method, has relatively low execution efficiency, and obviously, cannot be applied to an emergent help-seeking scenario.

It can be seen that, there is no relatively effective help-seeking method in the prior art.

SUMMARY

Embodiments of the present invention provide an information sending method, a network device, and a terminal, which attempt to resolve a technical problem in the prior art that there is no relatively good help-seeking method.

According to a first aspect of the present invention, an information sending method is provided, where the method may include receiving, by a first network device, alarm information sent by an alarm terminal; and after confirming the alarm information, generating, by the first network device, first guide information according to the alarm information, and sending the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

With reference to the first aspect, in a first possible implementation manner, the first guide information is information including help-seeking content, or the first guide information is information including road guide content.

With reference to the first possible implementation manner, in a second possible implementation manner, the method further includes receiving, by the first network device, location information of the alarm terminal that is sent by the alarm terminal, where the location information of the alarm terminal is obtained by the alarm terminal by means of AGPS or GPS; and the generating, by the first network device, first guide information according to the alarm information, and sending the first guide information to a target terminal includes generating, by the first network device, the first guide information according to the alarm information, and sending the first guide information to the target terminal, where the target terminal is a terminal that is determined, according to the location information of the alarm terminal and the first guide information, among terminals that are within same base-station signal coverage in which the alarm terminal is located, or, a terminal that is determined, according to the location information of the alarm terminal and the first guide information, among terminals whose distances from the alarm terminal are less than the threshold.

With reference to the first aspect or the first possible implementation manner, in a third possible implementation manner, confirming, by the first network device, the alarm information includes determining, by the first network device, whether the alarm information is valid alarm information, and determining, by the first network device according to information about the alarm terminal that is carried in the alarm information, whether the alarm terminal is an authorized terminal; and when the alarm information is valid alarm information, and the alarm terminal is an authorized terminal, confirming, by the first network device, that detection of the alarm information is passed.

With reference to the first aspect, the first possible implementation manner, or the second possible implementation manner, in a fourth possible implementation manner, generating, by the first network device, first guide information according to the alarm information includes parsing, by the first network device, the alarm information, and determining a meaning of the alarm information; and generating, by the first network device, the corresponding first guide information according to the meaning of the alarm information.

With reference to the first aspect, in a fifth possible implementation manner, sending the first guide information to a target terminal includes sending the first guide information to a second network device, and sending, using the second network device, to the target terminal second guide information that includes the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

With reference to the first aspect, the first possible implementation manner, the third possible implementation manner, or the fourth possible implementation manner, in a sixth possible implementation manner, generating, by the first network device, first guide information according to the alarm information, and sending the first guide information to a target terminal includes requesting, by the first network device according to the information about the alarm terminal that is carried in the alarm information, location information of the alarm terminal from a second network device; receiving, by the first network device, the location information of the alarm terminal that is fed back by the second network device; generating, by the first network device, the first guide information according to the alarm information and the location information of the alarm terminal, where the location information of the alarm terminal is obtained by the second network device by means of AGPS, or the location information of the alarm terminal is obtained by the second network device in a time of arrival (TOA) manner; and sending, by the first network device, the first guide information to the second network device, and sending, using the second network device, to the target terminal second guide information that includes the first guide information.

With reference to the first aspect or any one of the first to the fourth possible implementation manners, in a seventh possible implementation manner, generating, by the first network device, first guide information according to the alarm information, and sending the first guide information to a target terminal includes generating, by the first network device, the first guide information according to the alarm information; and determining, by the first network device, the target terminal according to the first guide information, and sending the first guide information to the target terminal, where the target terminal is a terminal that is determined, by the first network device according to the first guide information, among terminals that are within same base-station signal coverage in which the alarm terminal is located, or, a terminal that is determined, by the first network device according to the first guide information, among terminals whose distances from the alarm terminal are less than the threshold.

With reference to the seventh possible implementation manner, in an eighth possible implementation manner, determining, by the first network device, the target terminal according to the first guide information includes determining, by the first network device according to at least the first guide information and forte information of users corresponding to terminals that are within same base-station signal coverage in which the alarm terminal is located, the target terminal among the terminals that are within the same base-station signal coverage in which the alarm terminal is located; or, determining, by the first network device according to at least the first guide information and forte information of users corresponding to terminals whose distances from the alarm terminal are less than the threshold, the target terminal among the terminals whose distances from the alarm terminal are less than the threshold.

With reference to the first aspect or any one possible implementation manner of the first possible implementation manner to the eighth possible implementation manner, in a ninth possible implementation manner, the first guide information further includes navigation information that is from the target terminal to the alarm terminal.

According to a second aspect of the present invention, an information sending method is provided, where the method may include the following steps: receiving, by a first network device, alarm information sent by an alarm terminal; and after confirming the alarm information, generating, by the first network device, first guide information according to the alarm information, sending the first guide information to a second network device, and sending, using the second network device, to a target terminal second guide information that relates to the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than a threshold.

With reference to the second aspect, in a first possible implementation manner, the second guide information is information generated by the first network device according to the first guide information, or the second guide information is the first guide information.

According to a third aspect of the present invention, an information sending method is provided, where the method may include the following steps: sending, by a terminal, alarm information to a first network device; receiving, by the terminal, second guide information sent by the first network device, where the second guide information is generated by the first network device according to the alarm information; establishing, by the terminal, a communications link with a target terminal according to the second guide information; and sending, by the terminal, first guide information to the target terminal over the communications link with the target terminal, where the first guide information is generated by the terminal according to the alarm information, and the target terminal is a terminal selected from terminals that are within same base-station signal coverage in which the alarm terminal is located, or the target terminal is a terminal selected from terminals whose distances from the alarm terminal are less than a threshold.

With reference to the third aspect, in a first possible implementation manner, establishing, by the terminal, a communications link with a target terminal according to the second guide information includes establishing, by the terminal, the device-to-device (D2D) communications link with the target terminal according to the second guide information; and sending, by the terminal, first guide information to the target terminal over the communications link with the target terminal includes sending, by the terminal, the first guide information to the target terminal over the D2D communications link with the target terminal.

With reference to the third aspect or the first possible implementation manner, in a second possible implementation manner, the second guide information includes time-frequency resource information.

According to a fourth aspect of the present invention, a network device is provided and includes a receiving module configured to receive alarm information sent by an alarm terminal; and an operating module configured to, after confirming the alarm information, generate first guide information according to the alarm information, and send the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

With reference to the fourth aspect, in a first possible implementation manner, the first guide information is information including help-seeking content, or the first guide information is information including road guide content.

With reference to the first possible implementation manner, in a second possible implementation manner, the receiving module is further configured to receive location information of the alarm terminal that is sent by the alarm terminal, where the location information of the alarm terminal is obtained by the alarm terminal by means of AGPS/GPS; and the operating module is further configured to generate the first guide information according to the alarm information, and send the first guide information to the target terminal, where the target terminal is a terminal that is determined, according to the location information of the alarm terminal and the first guide information, among terminals that are within same base-station signal coverage in which the alarm terminal is located, or, a terminal that is determined, according to the location information of the alarm terminal and the first guide information, among terminals whose distances from the alarm terminal are less than the threshold.

With reference to the fourth aspect or the first possible implementation manner, in a third possible implementation manner, that the operating module is configured to confirm the alarm information is determining whether the alarm information is valid alarm information, and determining, according to information about the alarm terminal that is carried in the alarm information, whether the alarm terminal is an authorized terminal; and when the alarm information is valid alarm information, and the alarm terminal is an authorized terminal, confirming that detection of the alarm information is passed.

With reference to the fourth aspect, the first possible implementation manner, or the second possible implementation manner, in a fourth possible implementation manner, that the operating module is configured to generate first guide information according to the alarm information is parsing the alarm information and determining a meaning of the alarm information; and generating the corresponding first guide information according to the meaning of the alarm information.

With reference to the fourth aspect, in a fifth possible implementation manner, that the operating module is configured to send the first guide information to a target terminal is sending the first guide information to a second network device, and sending, using the second network device, to the target terminal second guide information that includes the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

With reference to the fourth aspect, the first possible implementation manner, the third possible implementation manner, or the fourth possible implementation manner, in a sixth possible implementation manner, the operating module is configured to request, according to the information about the alarm terminal that is carried in the alarm information, location information of the alarm terminal from a second network device; receive the location information of the alarm terminal that is fed back by the second network device; generate the first guide information according to the alarm information and the location information of the alarm terminal, where the location information of the alarm terminal is obtained by the second network device by means of AGPS, or the location information of the alarm terminal is obtained by the second network device in a TOA manner; and send the first guide information to the second network device, and send, using the second network device, to the target terminal second guide information that includes the first guide information.

With reference to the fourth aspect or any one possible implementation manner of the first possible implementation manner to the fourth possible implementation manner, in a seventh possible implementation manner, the operating module is configured to generate the first guide information according to the alarm information; and determine the target terminal according to the first guide information, and send the first guide information to the target terminal, where the target terminal is a terminal that is determined, by the network device according to the first guide information, among terminals that are within same base-station signal coverage in which the alarm terminal is located, or, a terminal that is determined, by the network device according to the first guide information, among terminals whose distances from the alarm terminal are less than the threshold.

With reference to the seventh possible implementation manner, in an eighth possible implementation manner, that the operating module is configured to determine the target terminal according to the first guide information is determining, according to at least the first guide information and forte information of users corresponding to terminals that are within same base-station signal coverage in which the alarm terminal is located, the target terminal among the terminals that are within the same base-station signal coverage in which the alarm terminal is located; or, determining, according to at least the first guide information and forte information of users corresponding to terminals whose distances from the alarm terminal are less than the threshold, the target terminal among the terminals whose distances from the alarm terminal are less than the threshold.

With reference to the fourth aspect or any one possible implementation manner of the first possible implementation manner to the eighth possible implementation manner, in a ninth possible implementation manner, the first guide information further includes navigation information between the target terminal and the alarm terminal.

According to a fifth aspect of the present invention, a network device is provided and includes a receiving module configured to receive alarm information sent by an alarm terminal; and an operating module configured to, after confirming the alarm information, generate first guide information according to the alarm information, send the first guide information to a second network device, and send, using the second network device, to a target terminal second guide information that relates to the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than a threshold.

With reference to the fifth aspect, in a first possible implementation manner, the second guide information is information generated by the network device according to the first guide information, or the second guide information is the first guide information.

According to a sixth aspect of the present invention, a terminal is provided and includes a sending module configured to send alarm information to a first network device; and send first guide information to a target terminal over a communications link with the target terminal, where the first guide information is generated by the terminal according to the alarm information, and the target terminal is a terminal selected from terminals that are within same base-station signal coverage in which the alarm terminal is located, or the target terminal is a terminal selected from terminals whose distances from the alarm terminal are less than a threshold; a receiving module configured to receive second guide information sent by the first network device, where the second guide information is generated by the first network device according to the alarm information; and an establishing module configured to establish the communications link with the target terminal according to the second guide information.

With reference to the sixth aspect, in a first possible implementation manner, the establishing module is configured to establish a D2D communications link with the target terminal according to the second guide information; and the sending module is configured to send the first guide information to the target terminal over the D2D communications link with the target terminal.

With reference to the sixth aspect or the first possible implementation manner, in a second possible implementation manner, the second guide information includes time-frequency resource information.

According to a seventh aspect of the present invention, an information sending apparatus is provided and includes a memory configured to store an instruction; a receiver configured to receive alarm information sent by an alarm terminal; a processor configured to execute the instruction, and after confirming the alarm information, generate first guide information according to the alarm information; and a transmitter configured to send the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

With reference to the seventh aspect, in a first possible implementation manner, the first guide information is information including help-seeking content, or the first guide information is information including road guide content.

With reference to the first possible implementation manner, in a second possible implementation manner, the receiver is further configured to receive location information of the alarm terminal that is sent by the alarm terminal, where the location information of the alarm terminal is obtained by the alarm terminal by means of AGPS or GPS; the processor is configured to execute the instruction, and generate the first guide information according to the alarm information; and the transmitter is configured to send the first guide information to the target terminal, where the target terminal is a terminal that is determined, according to the location information of the alarm terminal and the first guide information, among terminals that are within same base-station signal coverage in which the alarm terminal is located, or, a terminal that is determined, according to the location information of the alarm terminal and the first guide information, among terminals whose distances from the alarm terminal are less than the threshold.

With reference to the seventh aspect or the first possible implementation manner, in a third possible implementation manner, that the processor is configured to execute the instruction and confirm the alarm information is that the processor executes the instruction and determines whether the alarm information is valid alarm information; the processor determines, according to information about the alarm terminal that is carried in the alarm information, whether the alarm terminal is an authorized terminal; and when the alarm information is valid alarm information, and the alarm terminal is an authorized terminal, the processor confirms that detection of the alarm information is passed.

With reference to the seventh aspect, the first possible implementation manner, or the second possible implementation manner, in a fourth possible implementation manner, that the processor is configured to generate first guide information according to the alarm information is that the processor executes the instruction, parses the alarm information, and determines a meaning of the alarm information; and the processor generates the corresponding first guide information according to the meaning of the alarm information.

With reference to the seventh aspect, in a fifth possible implementation manner, the transmitter is configured to send the first guide information to a second network device, and send, using the second network device, to the target terminal second guide information that includes the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

With reference to the seventh aspect, the first possible implementation manner, the third possible implementation manner, or the fourth possible implementation manner, in a sixth possible implementation manner, the transmitter is further configured to request, according to the information about the alarm terminal that is carried in the alarm information, location information of the alarm terminal from a second network device; the receiver is further configured to receive the location information of the alarm terminal that is fed back by the second network device; the processor is configured to execute the instruction, generate the first guide information according to the alarm information and the location information of the alarm terminal, where the location information of the alarm terminal is obtained by the second network device by means of AGPS, or the location information of the alarm terminal is obtained by the second network device in a TOA manner; and the transmitter is configured to send the first guide information to the second network device, and send, using the second network device, to the target terminal second guide information that includes the first guide information.

With reference to the seventh aspect or any one possible implementation manner of the first possible implementation manner to the fourth possible implementation manner, in a seventh possible implementation manner, the processor is configured to execute the instruction, generate first guide information according to the alarm information, and determine the target terminal according to the first guide information; and the transmitter is configured to send the first guide information to the target terminal, where the target terminal is a terminal that is determined, by the processor according to the first guide information, among terminals that are within same base-station signal coverage in which the alarm terminal is located, or, a terminal that is determined, by the processor according to the first guide information, among terminals whose distances from the alarm terminal are less than the threshold.

With reference to the seventh possible implementation manner, in an eighth possible implementation manner, that the processor is configured to execute the instruction and determine the target terminal according to the first guide information is that the processor executes the instruction, and determines, according to at least the first guide information and forte information of users corresponding to terminals that are within same base-station signal coverage in which the alarm terminal is located, the target terminal among the terminals that are within the same base-station signal coverage in which the alarm terminal is located; or, the processor executes the instruction, and determines, according to at least the first guide information and forte information of users corresponding to terminals whose distances from the alarm terminal are less than the threshold, the target terminal among the terminals whose distances from the alarm terminal are less than the threshold.

With reference to the seventh aspect or any one possible implementation manner of the first possible implementation manner to the eighth possible implementation manner, in a ninth possible implementation manner, the first guide information further includes navigation information that is from the target terminal to the alarm terminal.

According to an eighth aspect of the present invention, an information sending apparatus is provided and includes a memory configured to store an instruction; a receiver configured to receive alarm information sent by an alarm terminal; a processor configured to execute the instruction, and after confirming the alarm information, generate first guide information according to the alarm information; and a transmitter configured to send the first guide information to a second network device, and send, using the second network device, to a target terminal second guide information that relates to the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than a threshold.

With reference to the eighth aspect, in a first possible implementation manner, the second guide information is information generated by the first network device according to the first guide information, or the second guide information is the first guide information.

According to a ninth aspect of the present invention, an information sending apparatus is provided and includes a memory configured to store an instruction; a transmitter configured to send alarm information to a first network device; and send first guide information to a target terminal over a communications link with the target terminal, where the first guide information is generated by the terminal according to the alarm information, and the target terminal is a terminal selected from terminals that are within same base-station signal coverage in which the alarm terminal is located, or the target terminal is a terminal selected from terminals whose distances from the alarm terminal are less than a threshold; a receiver configured to receive second guide information sent by the first network device, where the second guide information is generated by the first network device according to the alarm information; and a processor configured to execute the instruction and establish the communications link with the target terminal according to the second guide information.

With reference to the ninth aspect, in a first possible implementation manner, the processor is configured to execute the instruction and establish a D2D communications link with the target terminal according to the second guide information; and the transmitter is configured to send the first guide information to the target terminal over the D2D communications link with the target terminal.

With reference to the ninth aspect or the first possible implementation manner, in a second possible implementation manner, the second guide information includes time-frequency resource information.

In the embodiments of the present invention, after receiving the alarm information, the first network device may generate the first guide information and send the first guide information to the target terminal. In this way, the target terminal may respond to the alarm information, and help rescue a user of the alarm terminal. Because the target terminal is a terminal selected from terminals that are within same base-station signal coverage in which the alarm terminal is located, or the target terminal is a terminal selected from terminals whose distances from the alarm terminal are less than a threshold, which means that a distance between the target terminal and the alarm terminal is relatively short, so that a rescuer can arrive at the site in time to rescue the user of the alarm terminal, thereby effectively improving rescue efficiency. The first network device automatically sends the first guide information to the target terminal, where there may be one or more target terminals, and the alarm terminal does not need to send the first guide information one by one; therefore, efficiency of information transmission is relatively high, and it is ensured to the greatest extent that the user of the alarm terminal can be rescued in time.

BRIEF DESCRIPTION OF DRAWINGS

FIG. 1 is a main flowchart of an information sending method on a network device side according to an embodiment of the present invention;

FIG. 2 is a main flowchart of another information sending method on a network device side according to an embodiment of the present invention;

DESCRIPTION OF EMBODIMENTS

Figure 3:
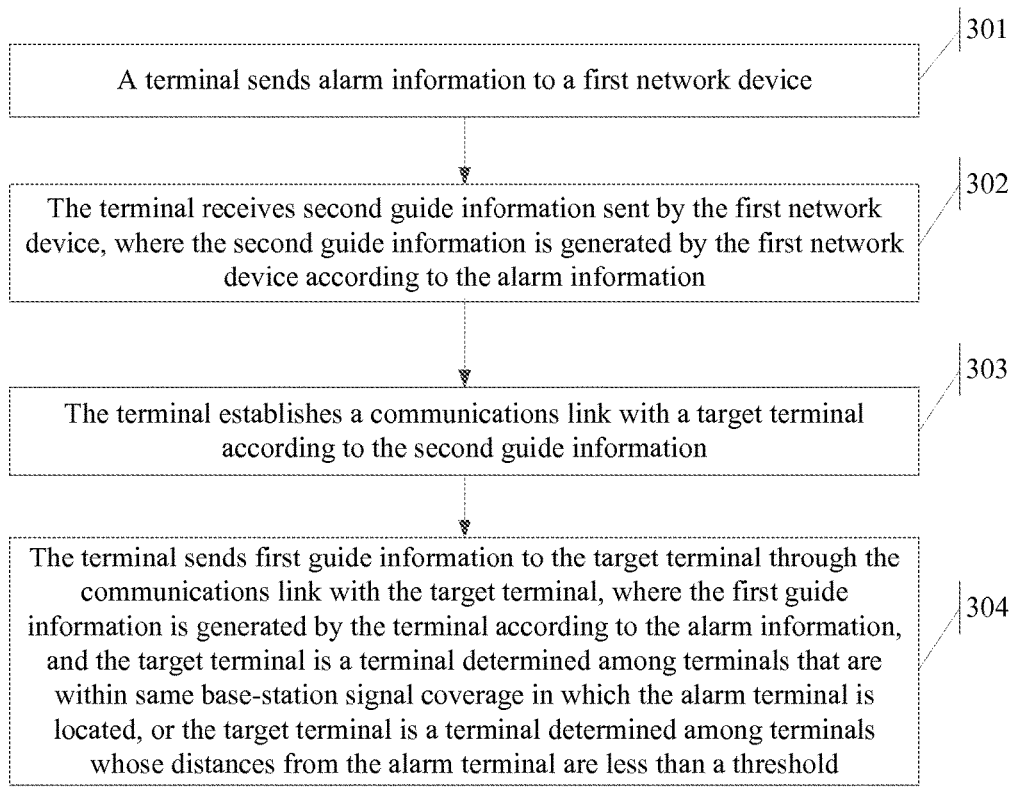
FIG. 3 is a main flowchart of an information sending method on a terminal side according to an embodiment of the present invention.

The information sending method in the embodiments of the present invention may include receiving, by a first network device, alarm information sent by an alarm terminal; and after confirming the alarm information, generating, by the first network device, first guide information according to the alarm information, and sending the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

In the embodiments of the present invention, after receiving the alarm information, the first network device may generate the first guide information and send the first guide information to the target terminal. In this way, the target terminal may respond to the alarm information, and help rescue a user of the alarm terminal. Because the target terminal is a terminal selected from terminals that are within same base-station signal coverage in which the alarm terminal is located, or the target terminal is a terminal selected from terminals whose distances from the alarm terminal are less than a threshold, which means that a distance between the target terminal and the alarm terminal is relatively short, so that the target terminal can arrive at the site in time to rescue the user of the alarm terminal, thereby effectively improving rescue efficiency. The first network device automatically sends the first guide information to the target terminal, where there may be one or more target terminals, and the alarm terminal does not need to send the first guide information one by one; therefore, efficiency of information transmission is relatively high, and it is ensured to the greatest extent that the user of the alarm terminal can be rescued in time.

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current second generation (2G) and third generation (3G) communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, the embodiments of the present invention are described in detail with reference to the accompanying drawings of the specification.

Referring to FIG. 1, an embodiment of the present invention provides an information sending method, and a main procedure of the method is as follows:

Step 101: A first network device receives alarm information sent by an alarm terminal.

For example, the first network device may be an alarm center server. The alarm terminal includes, for example, a help-seeking module; and a user triggers the help-seeking module, and the alarm terminal may automatically send alarm (help-seeking) information to the first network device.

Preferably, before, after, or when the first network device receives the alarm information sent by the alarm terminal, the method further includes that the first network device receives location information of the alarm terminal that is sent by the alarm terminal, where the location information of the alarm terminal is obtained by the alarm terminal by means of AGPS/GPS.

If the location information of the alarm terminal is obtained by means of AGPS, the alarm terminal and a base station need to jointly participate when the location information of the alarm terminal is obtained.

That is, after detecting that the user triggers the help-seeking module, the alarm terminal may acquire the location information of the alarm terminal, and send the alarm information and the location information of the alarm terminal to the first network device using a radio communications system. The location information of the alarm terminal may also be carried in the alarm information; or, the location information of the alarm terminal may be carried in other information for sending.

A manner in which the user triggers the help-seeking module may include calling 110 using the alarm terminal, pressing an SOS button on the alarm terminal, starting help-seeking software in the alarm terminal, or the like.

After the alarm terminal detects that the help-seeking module is triggered, if the alarm terminal has a positioning module, a processor module of the alarm terminal reads the location information of the alarm terminal using the positioning module. For example, the positioning module may be a GPS module, and the location information of the alarm terminal is, for example, latitude and longitude information of the alarm terminal. If the help-seeking module is triggered, but the positioning module is not started yet, the processor module may activate the positioning module.

The manner in which the user triggers the help-seeking module may be sending a help-seeking request to the alarm terminal, where the help-seeking request may be, for example, a real-time voice call during which the alarm terminal dials the 110 number, or may be information that is preset in the alarm terminal, or may be a segment of voice information that the user dictates temporarily.

Step 102: After confirming the alarm information, the first network device generates first guide information according to the alarm information, and sends the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

Preferably, in this embodiment of the present invention, after receiving the alarm information, the first network device may first confirm the alarm information or put the alarm information on a record. The confirming the alarm information may include confirming the alarm terminal, or, confirming the alarm information. The putting the alarm information on a record may refer to recording the alarm information.

Preferably, that the first network device confirms the alarm information may include that the first network device determines whether the alarm information is valid alarm information, and the first network device determines, according to information about the alarm terminal that is carried in the alarm information, whether the alarm terminal is an authorized terminal; and when the alarm information is valid alarm information, and the alarm terminal is an authorized terminal, the first network device confirms that detection of the alarm information is passed.

For example, the information about the alarm terminal may include an identifier of the alarm terminal. For example, a whitelist may be stored on the first network device side, where the whitelist may include identifiers of authorized terminals. The first network device may look up, in the whitelist, whether the whitelist includes the identifier of the alarm terminal; if the whitelist includes the identifier of the alarm terminal, it indicates that the alarm terminal is an authorized terminal, and if the first network device confirms that the alarm information is valid alarm information, the first network device may generate the first guide information according to the alarm information; and if the whitelist does not include the identifier of the alarm terminal, it indicates that the alarm terminal is an unauthorized terminal, the first network device may not respond to the alarm information, or if the alarm information is invalid alarm information, the first network device may not respond to the alarm information, either. In this way, security of a network system may be ensured to the greatest extent, and a malicious attack may be avoided.

In addition, an identity of a user of the alarm information, for example, may be further carried in the alarm information for sending. The first network device may verify the identity of the user and determine whether the user is an authorized user; if the user is an authorized user, the first network device responds to the alarm information; and if the user is an unauthorized user, the first network device does not respond to the alarm information, thereby avoiding fake alarm information.

After receiving the alarm information, the first network device may generate the first guide information according to the alarm information.

Preferably, before, after, or when the first network device receives the alarm information sent by the alarm terminal, the method may further include that the first network device receives the location information of the alarm terminal that is sent by the alarm terminal, where the location information of the alarm terminal is obtained by the alarm terminal by means of AGPS/GPS.

If the first network device receives the location information of the alarm terminal that is sent by the alarm terminal, that the first network device generates the first guide information according to the alarm information, and sends the first guide information to the target terminal may include that the first network device generates the first guide information according to the alarm information, and sends the first guide information to the target terminal, where the target terminal is a terminal that is determined, according to the location information of the alarm terminal and the first guide information, among terminals that are within same base-station signal coverage in which the alarm terminal is located, or, a terminal that is determined, according to the location information of the alarm terminal and the first guide information, among terminals whose distances from the alarm terminal are less than the threshold.

In this embodiment of the present invention, the first guide information may be information of different types. For example, the first guide information may be information including help-seeking content, the first guide information may be information including road guide content, or the like.

Preferably, in this embodiment of the present invention, that the first network device generates the first guide information according to the alarm information may include that the first network device parses the alarm information, and determines a meaning of the alarm information; and the first network device generates the corresponding first guide information according to the meaning of the alarm information.

For example, if the meaning of the alarm information is that "a person falls into water and is rescued, but is in a coma", the first network device may expect to find a rescuer who is near the help seeker and can perform artificial respiration. Therefore, a meaning of the first guide information generated by the first network device may be that "a person nearby falls into water and is rescued; and if you are familiar with artificial respiration, please offer help at once". It can be seen that, in this embodiment of the present invention, the first network device can translate the alarm information of the user into an explicit rescue requirement, so that a user using the target terminal can directly grasp the requirement of the help seeker, thereby offering rescue as soon as possible.

For example, a manner of parsing the alarm information may be performed by semantic parsing on a text of the alarm information, where the semantic parsing may be determining, based on identification samples between words (phrases) recorded in a database, a meaning of a segment of the text according to a statistical language model and the identification samples. Further, the first network device may store a semantic comprehension template, and the alarm information is directly mapped to the first guide information according to the meaning of the alarm information. Table 1 shows a mapping relationship, where keywords are all those included in the alarm information.

TABLE 1

| Keyword 1 | Keyword 2 | First Guide Information |
|---|---|---|
| Fall into water | Seek help | At xxx site, a person falls into water. A nearby swimmer, please offer help as soon as possible. |
| Fall into water | Breathe/Coma | At xxx site, a person falls into water and is rescued. A nearby rescuer who can perform artificial respiration, please offer help as soon as possible. |
| Breathe/Coma | Fall in a faint | At xxx site, a person falls in a faint. A nearby rescuer who can provide first aid, please offer help as soon as possible. |

Another possible application scenario is real-time location-based traffic information pushing. A most common scenario is that a traffic accident occurs on a road, which leads to a traffic jam; however, a driver of a vehicle blocked on the road or another driver who is about to drive into the road does not know a reason and situation of the traffic jam, for example, normal car crawling, complete blocking of the road, or that the traffic accident has been handled.

In this scenario, the alarm terminal may be a terminal that is authenticated, for example, a terminal exclusively used by the traffic police, and registers with the first network device side, where the first network device is, for example, an alarm center server; or the alarm terminal may be a common terminal.

The alarm terminal sends the alarm information to the first network device using, for example, a radio communications system. In this case, the alarm information is, for example, road information; and the alarm terminal may further send the location information of the alarm terminal to the first network device. For example, the road information sent by the alarm terminal is that "two cars are rear-ended at xxx intersection, and it is estimated that handling will be completed in five minutes". After receiving the road information, the first network device first determines whether the alarm terminal is a registered terminal or a real-name terminal. If it is determined that the alarm terminal is a registered terminal or a real-name terminal, the first network device generates the first guide information, where the first guide information is, for example, information including road guide content. For example, the first guide information is that "a traffic stream in x direction of xxx road is slow because two cars are rear-ended, it will go back to normal in five minutes, and a driver who needs to pass by this road can be at ease for driving". The first network device may select the target terminal, that is, select an object to which the first guide information is sent. For example, the first network device may calculate, according to the location information of the alarm terminal and the road information, which road section or sections are affected, and select a base station sector that is close to the road section to send the first guide information to the corresponding target terminal.

Further, if a user needs to receive information including road guide content in real time, corresponding terminal road software may be installed in a terminal used by the user, and whether a function of receiving a road guide is enabled may be set; and if the user sets that the function of receiving a road guide is enabled for the terminal, the first network device may send information including road guide content to the terminal. Correspondingly, the first network device may also send information including road guide content only to a terminal in which the terminal road software is installed, so as not to disturb another user who does not drive on this road section or a user who does not need to receive information including road guide content.

Preferably, the first guide information may further include the location information of the alarm terminal and/or navigation information, where the navigation information is navigation information between the target terminal and the alarm terminal. Different target terminals correspond to different navigation information.

Preferably, in this embodiment of the present invention, that the first network device generates the first guide information according to the alarm information and sends the first guide information to a target terminal may include that the first network device generates the first guide information according to the alarm information; the first network device determines the target terminal according to the first guide information, and sends the first guide information to the target terminal, where the target terminal is a terminal that is determined, by the first network device according to the first guide information, among terminals that are within same base-station signal coverage in which the alarm terminal is located, or, a terminal that is determined, by the first network device according to the first guide information, among terminals whose distances from the alarm terminal are less than the threshold.

That is, the first network device may determine the target terminal according to the first guide information. For example, if the meaning of the alarm information is that "a person falls into water and is rescued, but is in a coma", the first network device may expect to find a rescuer who is near the help seeker and can perform artificial respiration. Therefore, the meaning of the first guide information generated by the first network device may be that "a person nearby falls into water and is rescued; and if you are familiar with artificial respiration, please offer help at once". A user of the target terminal selected by the first network device should be familiar with artificial respiration, that is, the target terminal is selected according to the first guide information.

Preferably, in this embodiment of the present invention, that the first network device determines the target terminal according to the first guide information includes that the first network device determines, according to at least the first guide information and forte information of users corresponding to terminals that are within same base-station signal coverage in which the alarm terminal is located, the target terminal among the terminals that are within the same base-station signal coverage in which the alarm terminal is located; or, the first network device determines, according to at least the first guide information and forte information of users corresponding to terminals whose distances from the alarm terminal are less than the threshold, the target terminal among the terminals whose distances from the alarm terminal are less than the threshold.

Preferably, in this embodiment of the present invention, the sending the first guide information to a target terminal includes sending the first guide information to a second network device, and sending, using the second network device, to the target terminal second guide information that includes the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

That is, the first network device may send the first guide information to the target terminal; or, the first network device may send the first guide information to the second network device, and the second network device may generate the second guide information, include the first guide information in the second guide information, and send the second guide information to the target terminal.

For example, the second network device may be a network device in a radio communications system, for example, a base station; or, the second network device may be a social network server or the like, which is not limited by the present invention. The social network server in this embodiment of the present invention includes but is not limited to a background server for a social functioning website such as WeChat, microblog, or Facebook® (a social service networking site).

If the first guide information needs to be sent to the second network device, the first guide information may be guide information including essential help-seeding content, for example, the first guide information may be information including help-seeding content or may be information including road guide content; or the first guide information may include only the alarm information or include only the information about the alarm terminal, but does not include essential help-seeding content, that is, the essential help-seeding content needs to be generated by the second network device. In this case, the second network device needs to analyze the alarm information. A specific analyzing process is similar to the foregoing analyzing process of the first network device, and for a specific example refer to Table 1, described above.

For example, after receiving the first guide information sent by the first network device, a network device in a radio communications system sends the second guide information to a determined target terminal according to the location information of the alarm terminal. For example, the network device in the radio communications system sends, according to a base station in which the alarm terminal is located, the second guide information to terminals within coverage of the base station; or the network device in the radio communications system sends, according to a location of the alarm terminal, the second guide information to terminals whose distances from the alarm terminal are less than a preset distance.

The second guide information may include, for example, the location information of the alarm terminal and/or navigation information. The navigation information is navigation information between the target terminal and the alarm terminal. When target terminals are different, corresponding navigation information is also different.

Further, the second guide information sent by the second network device may not include the location information of the alarm terminal, and the target terminals that receive the second guide information may feed an acknowledgement message back to the second network device, where the acknowledgement message may be used to indicate whether a user of a corresponding target terminal can offer rescue. If the acknowledgement message fed back by a target terminal is a message for confirming rescue, the second network device may further send the location information of the alarm terminal and/or navigation information to the target terminal, to help the rescuer find the help seeker as soon as possible; and if the acknowledgement message fed back by a target terminal is a message for confirming no rescue, the second network device does not need to send other messages to the target terminal, which can reduce, to the greatest extent, an amount of information that the second network device needs to send, and less information that needs to be sent indicates a higher information sending speed, thereby saving time.

For example, a target terminal that receives the second guide information may feed back to the network device in the radio communications system whether a user using the target terminal can perform rescue. For example, if obtaining a message for confirming rescue from a target terminal, the network device in the radio communications system may send the location information of the alarm terminal and/or navigation information to the target terminal, and instruct a user using the target terminal to find the help seeker quickly.

The social network server may collect/acquire geographical location information of each online terminal, that is, the server can grasp the geographical location information of each terminal in real time. After receiving the alarm information, the social network server may look up, according to the location information of the alarm terminal, online terminals that are within a distance from the alarm terminal, and send the second guide information to these terminals.

For example, the social network server may first send the second guide information to target terminals that are within a 100-meter radius of the alarm terminal; if no terminal replies to confirm rescue within a preset period of time, the social network server may extend the range to a 200-meter radius of the alarm terminal, and send the second guide information to target terminals that are within the range, and so on; the social network server sends the second guide information as much as possible until a response of confirming rescue is received.

Further, when each terminal registers with the social network server, a corresponding user may note a rescue forte of the user, for example, a swimming lifeguard, a surgeon, wrestling, and artificial respiration. In addition, the corresponding user may set in real time whether a "rescue" function is enabled for social terminal software corresponding to the social network server; and when the user disables the rescue function, the server does not push the second guide information to the user.

All kinds of terminal software mentioned in the present invention may be, for example, all kinds of communications software such as WeChat, QQ (a kind of instant messaging software), and Skype® (a kind of communications software).

Preferably, after receiving the first guide information, the social network server may perform screening, according to the location information of the alarm terminal, to obtain a terminal that meets a condition and for which the rescue function is enabled; and further, the social network server obtains, by matching according to the second guide information, a user that meets a rescue condition, that is, obtaining, by matching, a user that can offer rescue; that is, the social network server selects a corresponding target terminal according to the location information of the alarm terminal and the second guide information, and then pushes the second guide information to the selected target terminal.

For example, the second guide information generated by the social network server is that "at xxx site, a person falls into water and is rescued; and a nearby rescuer who can perform artificial respiration, please offer help as soon as possible". The social network server first selects, from users near the alarm terminal, an online user that enables the rescue function; and then obtains a rescue forte by matching according to the second guide information, where the rescue forte in this case includes "swimming lifeguard" and "artificial respiration". The social network server pushes the second guide information to the two types of users; and for other users, although distances from the alarm terminal are relatively short, and the rescue function is enabled, because the users do not have the corresponding rescue forte, the social network server may not push the second guide information to the users. And the social network server may record a historical rescue record of a registered user, and mark and rank the registered user; and when selecting a nearby user, the server may prefer a user who has a greater rescue score or a higher rank.

Optionally, when a rescuer confirms offering help, the rescuer may click for confirming after receiving the second guide information, that is, replying to confirm rescue to the social network server; the social network server may further send the location information of the alarm terminal or navigation information to a terminal of the rescuer, or may send the location information and the navigation information at the same time; and the social network server may also send information about the rescuer to the alarm terminal. Alternatively, the social network server may send to the alarm terminal information about all rescuers who are obtained by screening, a user of the alarm terminal may select at least one rescuer from the rescuers and feed the at least one rescuer back to the social network server. After the rescuer confirms rescue or the user of the alarm terminal selects a rescuer, the social network server may send the location information of the alarm terminal or navigation information to the terminal of the rescuer, or may send the location information and the navigation information at the same time. The navigation information is a path along which the rescuer can find the help seeker, and a starting point and an ending point are a location of the rescuer and a location of the help seeker respectively. It can be seen that, for different target terminals, navigation information sent by the social network server may be different.

Preferably, in this embodiment of the present invention, that the first network device generates first guide information according to the alarm information, and sends the first guide information to a target terminal includes that the first network device requests, according to the information about the alarm terminal that is carried in the alarm information, location information of the alarm terminal from a second network device; the first network device receives the location information of the alarm terminal that is fed back by the second network device; the first network device generates the first guide information according to the alarm information and the location information of the alarm terminal, where the location information of the alarm terminal is obtained by the second network device by means of AGPS, or the location information of the alarm terminal is obtained by the second network device in a TOA manner; and the first network device sends the first guide information to the second network device, and sends, using the second network device, to the target terminal second guide information that includes the first guide information.

If the alarm terminal does not send the location information of the alarm terminal to the first network device, the first network device needs to obtain the location information of the alarm terminal. The information about the alarm terminal may be, for example, an identifier of the alarm terminal; and the first network device may request to obtain the location information of the alarm terminal from the second network device according to the identifier of the alarm terminal.

For example, if the alarm terminal does not include the positioning module, obviously the alarm terminal cannot report the location information of the alarm terminal. The first network device may request to obtain the location information of the alarm terminal from the network device in the radio communications system.

Preferably, in this embodiment of the present invention, if the second network device needs to determine the location information of the alarm terminal, the second network device can only be a network device in the radio communications system, and cannot be a social network server.

After the first network device receives the alarm information but does not receive the location information of the alarm terminal, the first network device sends, to the network device in the radio communications system, a request for acquiring the location information of the alarm terminal, and the first network device may send the information about the alarm terminal to the network device in the radio communications system. The network device in the radio communications system calculates the location information of the alarm terminal according to the information about the alarm terminal, and sends the location information to a server of a 110 alarm center.

A possible manner of the first network device requesting to obtain the location information of the alarm terminal from the network device in the radio communications system is that a Visitor Location Register (VLR) in the radio communications system is used to calculate the location information of the help-seeking user, and the VLR identifies, according to a name of a base station to which the alarm terminal belongs, a physical location of the base station, and determines that the physical location of the base station is the location of the alarm terminal.

A possible manner of the first network device requesting to obtain the location information of the alarm terminal from the network device in the radio communications system is confirming a location of the mobile terminal using TOA. TOA and time difference of arrival (TDOA) are positioning methods based on radio-wave transmission time, and are also positioning methods of three base stations; positioning of both TOA and TDOA requires three base stations whose locations are known to cooperate at the same time; the three base stations calculate distances from the alarm terminal, and finally calculate an actual physical location of the alarm terminal. This manner is more accurate than the foregoing manner, and is completed by a base station in the radio communications system.

In a more specific scenario, a elder citizen carries a terminal or a wearable device; when the senior citizen is in danger (for example, tumbling or a sudden disease attack), the elder user may trigger the terminal or the wearable device to generate a help-seeking signal and send the help-seeking signal to an alarm center (the first network device). Alarm content may be selected from, for example: 1. a danger occurs, and help is needed; 2. a fault of another person causes danger, and help is needed; and the like. A danger type may be further included; and with improvement of the terminal or the wearable device, a physical sign parameter of the elder user may be further sent. The alarm center server generates a rescue guide according to the foregoing obtained help-seeking signal, and sends the rescue guide to a person near the elder user who seeks help. The foregoing method may be used in this scenario; in addition, a manner in which the user of the terminal or the wearable device sends the alarm information may further be that the alarm center (the first network device) receives alarm information sent by an alarm terminal; and after confirming the alarm information, the alarm center generates first help-seeking information (which may be called first guide information) according to the alarm information, and sends the first help-seeking information to a target terminal, so that the target terminal can respond to the alarm information according to the first help-seeking information, where the target terminal is a terminal selected from terminals that are within same base-station signal coverage in which the alarm terminal is located, or the target terminal is a terminal selected from terminals whose distances from the alarm terminal are less than a threshold. Further, the target terminal may be a specified terminal, for example, a terminal user with a set pre-stored number, or an associated user (a child, relative, doctor, or the like).

In this scenario, according to alarm or help-seeking information, a purposeful and timely response is more easily obtained, and misgivings of people about a help-seeking request are easily dispelled.

Referring to FIG. 2, an embodiment of the present invention provides another information sending method, and a main procedure of the method is as follows:

Step 201: A first network device receives alarm information sent by an alarm terminal.

Step 202: After confirming the alarm information, the first network device generates first guide information according to the alarm information, sends the first guide information to a second network device, and sends, using the second network device, to a target terminal second guide information that relates to the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than a threshold.

The manner in which the first network device confirms the alarm information or puts the alarm information on a record has been described in the procedure in FIG. 1, which is not described herein again.

Preferably, in this embodiment of the present invention, the second guide information is information generated by the first network device according to the first guide information, or the second guide information is the first guide information.

Preferably, in this embodiment of the present invention, that the second network device sends to the target terminal second guide information that relates to the first guide information may include that the second network device determines the second guide information according to the first guide information; and the second network device determines the target terminal according to the second guide information and the location information of the alarm terminal, and sends the second guide information to the target terminal.

That is, the second network device may determine the target terminal, according to the second guide information and the location information of the alarm terminal, among terminals that are within same base-station signal coverage in which the alarm terminal is located, or, the second network device may determine the target terminal, according to the second guide information and the location information of the alarm terminal, among terminals whose distances from the alarm terminal are less than the threshold. For example, if a meaning of the alarm information is that "a person falls into water and is rescued, but is in a coma", the second network device may expect to find a rescuer who is near the help seeker and can perform artificial respiration. Therefore, a meaning of the second guide information generated by the second network device may be that "a person nearby falls into water and is rescued; and if you are familiar with artificial respiration, please offer help at once". When the second network device performs selecting, a user of the selected target terminal should be familiar with artificial respiration, that is, selecting according to the second guide information.

Preferably, in this embodiment of the present invention, that the second network device determines the target terminal according to the second guide information includes that the second network device determines, according to at least the second guide information and forte information of users corresponding to terminals that are within same base-station signal coverage in which the alarm terminal is located, the target terminal among the terminals that are within the same base-station signal coverage in which the alarm terminal is located; or, the second network device determines, according to at least the second guide information and forte information of users corresponding to terminals whose distances from the alarm terminal are less than the threshold, the target terminal among the terminals whose distances from the alarm terminal are less than the threshold.

Referring to FIG. 3, an embodiment of the present invention provides an information sending method, and a main procedure of the method is as follows.

Step 301: A terminal sends alarm information to a first network device.

In this embodiment of the present invention, the terminal may be the alarm terminal described above. For example, a user triggers the help-seeking module of the alarm terminal, and the alarm terminal sends the alarm information to the first network device.

Step 302: The terminal receives second guide information fed back by the first network device, where the second guide information is generated by the first network device according to the alarm information.

Step 303: The terminal establishes a communications link with a target terminal according to the second guide information.

Preferably, the communications link may refer to a D2D communications link. The second guide information may include time-frequency resource information that is required by the terminal during establishment of the D2D communications link.

Preferably, that the terminal establishes a communications link with a target terminal according to the second guide information includes that the terminal establishes a D2D communications link with the target terminal according to the second guide information.

Step 304: The terminal sends first guide information to the target terminal over the communications link with the target terminal, where the first guide information is generated by the terminal according to the alarm information, and the target terminal is a terminal selected from terminals that are within same base-station signal coverage in which the alarm terminal is located, or the target terminal is a terminal selected from terminals whose distances from the alarm terminal are less than a threshold.

Preferably, the terminal may generate the first guide information according to the alarm information. For example, the first guide information may be the alarm information; or the first guide information may be information that has a guide function and is generated by the terminal according to the alarm information, for example, may be guide information described in the foregoing embodiments.

Preferably, that the terminal sends first guide information to the target terminal over the communications link with the target terminal may include that the terminal sends the first guide information to the target terminal over the D2D communications link with the target terminal.

That is, the alarm terminal may directly communicate with the target terminal, without transferring by another network device, thereby improving communication efficiency. The terminals communicate using a D2D standard. D2D is a technology that allows, under control of a system, terminals to communicate directly by reusing a cell resource, and D2D can improve spectrum efficiency of a cellular communications system, reduce transmit power of a terminal, and resolve to some extent a problem that spectrum resources of a radio communications system are insufficient. Resources occupied by each D2D communications link are equal to those occupied by one cellular communications link. During D2D communication, frequency resources and transmit power that are required during communication are obtained under control of a cellular base station. Cell users may communicate using a base-station service, or may communicate directly over a D2D link. A cellular communication base station communicates with a terminal using a control signal, and terminals may perform service communication directly.

Figure 4:
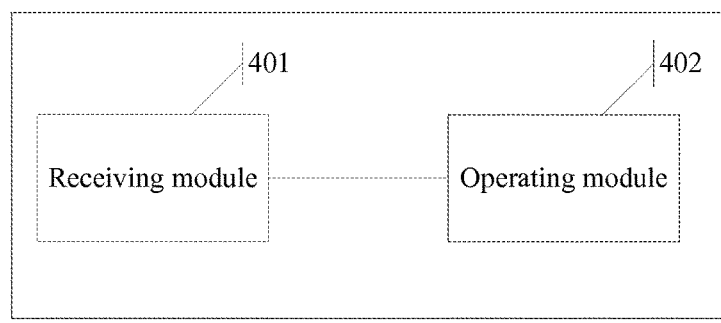
FIG. 4 is a structural block diagram of a network device according to an embodiment of the present invention.

Referring to FIG. 4, based on a same inventive concept, an embodiment of the present invention provides a network device, where the network device may include a receiving module 401 and an operating module 402. The network device may be the first network device described above.

The receiving module 401 may be configured to receive alarm information sent by an alarm terminal.

The operating module 402 may be configured to, after confirming the alarm information, generate first guide information according to the alarm information, and send the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

Preferably, in this embodiment of the present invention, the first guide information is information including help-seeking content, or the first guide information is information including road guide content.

Preferably, in this embodiment of the present invention, the receiving module 401 may further be configured to receive location information of the alarm terminal that is sent by the alarm terminal, where the location information of the alarm terminal is obtained by the alarm terminal by means of AGPS/GPS; and the operating module 402 may further be configured to generate the first guide information according to the alarm information, and send the first guide information to the target terminal, where the target terminal is a terminal that is determined, according to the location information of the alarm terminal and the first guide information, among terminals that are within same base-station signal coverage in which the alarm terminal is located, or, a terminal that is determined, according to the location information of the alarm terminal and the first guide information, among terminals whose distances from the alarm terminal are less than the threshold.

Preferably, in this embodiment of the present invention, that the operating module 402 may be configured to confirm the alarm information is determining whether the alarm information is valid alarm information, and determining, according to information about the alarm terminal that is carried in the alarm information, whether the alarm terminal is an authorized terminal; and when the alarm information is valid alarm information, and the alarm terminal is an authorized terminal, confirming that detection of the alarm information is passed.

Preferably, in this embodiment of the present invention, that the operating module 402 may be configured to generate first guide information according to the alarm information is parsing the alarm information and determining a meaning of the alarm information; and generating the corresponding first guide information according to the meaning of the alarm information.

Preferably, in this embodiment of the present invention, that the operating module 402 may be configured to send the first guide information to a target terminal is sending the first guide information to a second network device, and sending, using the second network device, to the target terminal second guide information that includes the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

Preferably, in this embodiment of the present invention, the operating module 402 may be configured to request, according to the information about the alarm terminal that is carried in the alarm information, location information of the alarm terminal from a second network device; receive the location information of the alarm terminal that is fed back by the second network device; generate the first guide information according to the alarm information and the location information of the alarm terminal, where the location information of the alarm terminal is obtained by the second network device by means of AGPS, or the location information of the alarm terminal is obtained by the second network device in a TOA manner; and send the first guide information to the second network device, and send, using the second network device, to the target terminal second guide information that includes the first guide information.

Preferably, in this embodiment of the present invention, the target terminal is a terminal that is determined, by the network device according to the first guide information, among terminals whose distances from the alarm terminal are less than the threshold.

Preferably, in this embodiment of the present invention, that the operating module 402 may be configured to determine the target terminal according to the first guide information is determining, according to at least the first guide information and forte information of users corresponding to terminals that are within same base-station signal coverage in which the alarm terminal is located, the target terminal among the terminals that are within the same base-station signal coverage in which the alarm terminal is located; or, determining, according to at least the first guide information and forte information of users corresponding to terminals whose distances from the alarm terminal are less than the threshold, the target terminal among the terminals whose distances from the alarm terminal are less than the threshold.

Preferably, in this embodiment of the present invention, the first guide information further includes navigation information between the target terminal and the alarm terminal.

Figure 5:
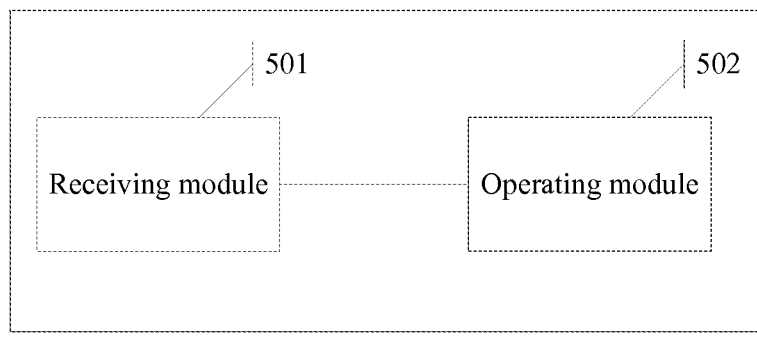
FIG. 5 is another structural block diagram of a network device according to an embodiment of the present invention.

Referring to FIG. 5, based on a same inventive concept, an embodiment of the present invention provides a network device, where the network device may include a receiving module 501 and an operating module 502. Preferably, the network device may be the first network device described above.

The receiving module 501 may be configured to receive alarm information sent by an alarm terminal.

The operating module 502 may be configured to, after confirming the alarm information, generate first guide information according to the alarm information, send the first guide information to a second network device, and send, using the second network device, to a target terminal second guide information that relates to the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

Preferably, in this embodiment of the present invention, the second guide information is information generated by the first network device according to the first guide information, or the second guide information is the first guide information.

Figure 6:
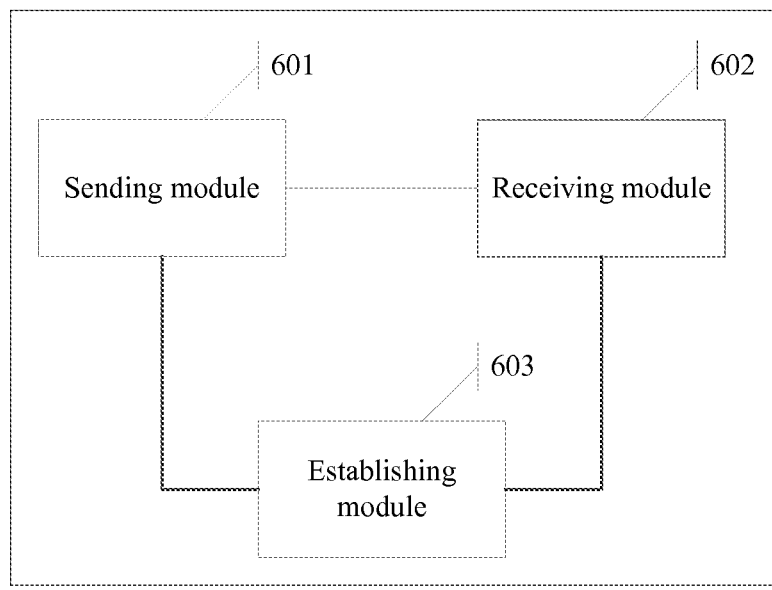
FIG. 6 is a structural block diagram of a terminal according to an embodiment of the present invention.

Referring to FIG. 6, based on a same inventive concept, an embodiment of the present invention provides a terminal, where the terminal may include a sending module 601, a receiving module 602, and an establishing module 603. The terminal may be the alarm terminal described above.

The sending module 601 may be configured to send alarm information to a first network device; and send first guide information to a target terminal over a communications link with the target terminal, where the first guide information is generated by the terminal according to the alarm information, and the target terminal is a terminal selected from terminals that are within same base-station signal coverage in which the alarm terminal is located, or the target terminal is a terminal selected from terminals whose distances from the alarm terminal are less than a threshold.

The receiving module 602 may be configured to receive second guide information sent by the first network device, where the second guide information is generated by the first network device according to the alarm information.

The establishing module 603 may be configured to establish the communications link with the target terminal according to the second guide information.

Preferably, the establishing module 603 may be configured to establish a D2D communications link with the target terminal according to the second guide information; and the sending module 601 may be configured to send the first guide information to the target terminal over the D2D communications link with the target terminal.

Preferably, the second guide information includes time-frequency resource information.

Figure 7:
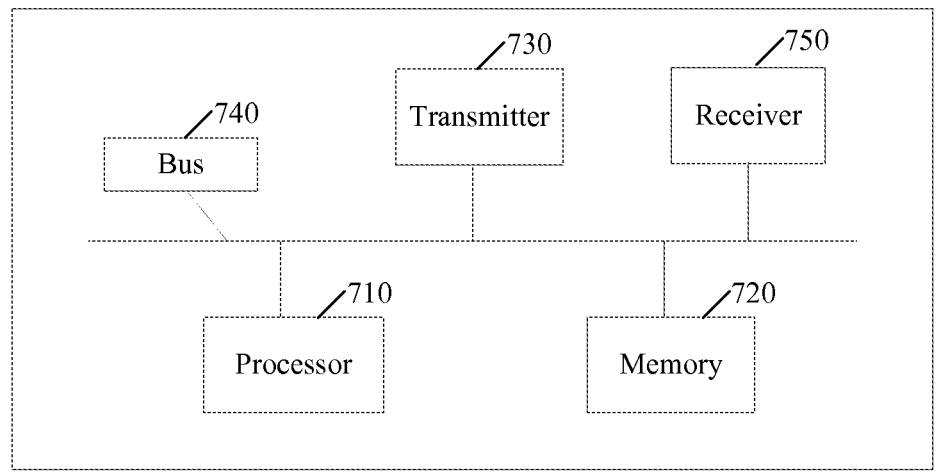
FIG. 7 is a schematic structural diagram of a network device according to an embodiment of the present invention.

Referring to FIG. 7, based on a same inventive concept, an embodiment of the present invention provides a network device, where the network device may be the first network device described above. The network device includes a bus 740, a processor 710 connected to the bus 740, a memory 720, a transmitter 730, and a receiver 750. The memory 720 is configured to store an instruction. The receiver 750 is configured to receive alarm information sent by an alarm terminal. The processor 710 is configured to execute the instruction, and after confirming the alarm information, generate the first guide information according to the alarm information. The transmitter 730 is configured to send the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

Preferably, in this embodiment of the present invention, the first guide information is information including help-seeking content, or the first guide information is information including road guide content.

Preferably, in this embodiment of the present invention, the receiver 750 is further configured to receive location information of the alarm terminal that is sent by the alarm terminal, where the location information of the alarm terminal is obtained by the alarm terminal by means of AGPS/GPS; the processor 710 is further configured to execute the instruction and generate the first guide information according to the alarm information; and the transmitter 730 is further configured to send the first guide information to the target terminal, where the target terminal is a terminal that is determined, according to the location information of the alarm terminal and the first guide information, among terminals that are within same base-station signal coverage in which the alarm terminal is located, or, a terminal that is determined, according to the location information of the alarm terminal and the first guide information, among terminals whose distances from the alarm terminal are less than the threshold.

Preferably, in this embodiment of the present invention, that the processor 710 is configured to execute the instruction and confirm the alarm information is executing the instruction, determining whether the alarm information is valid alarm information, determining according to information about the alarm terminal that is carried in the alarm information, whether the alarm terminal is an authorized terminal; and when the alarm information is valid alarm information, and the alarm terminal is an authorized terminal, confirming that detection of the alarm information is passed.

Preferably, in this embodiment of the present invention, the processor 710 is configured to execute the instruction, parse the alarm information, and determine a meaning of the alarm information; and generate the corresponding first guide information according to the meaning of the alarm information.

Preferably, in this embodiment of the present invention, the transmitter 730 is configured to send the first guide information to a second network device, and send, using the second network device, to the target terminal second guide information that includes the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

Preferably, in this embodiment of the present invention, the transmitter 730 is configured to request, according to the information about the alarm terminal that is carried in the alarm information, location information of the alarm terminal from a second network device; the receiver 750 is configured to receive the location information of the alarm terminal that is fed back by the second network device; the processor 710 is configured to execute the instruction and generate the first guide information according to the alarm information and the location information of the alarm terminal, where the location information of the alarm terminal is obtained by the second network device by means of AGPS, or the location information of the alarm terminal is obtained by the second network device in a TOA manner; and the transmitter 730 is configured to send the first guide information to the second network device, and send, using the second network device, to the target terminal second guide information that includes the first guide information.

Preferably, in this embodiment of the present invention, that the processor 710 is configured to execute the instruction, generate first guide information according to the alarm information and send the first guide information to a target terminal is generating the first guide information according to the alarm information; and determining the target terminal according to the first guide information; and the transmitter 730 is configured to send the first guide information to the target terminal, where the target terminal is a terminal that is determined, by the first network device according to the first guide information, among terminals that are within same base-station signal coverage in which the alarm terminal is located, or, a terminal that is determined, by the first network device according to the first guide information, among terminals whose distances from the alarm terminal are less than the threshold.

Preferably, in this embodiment of the present invention, that the processor 710 is configured to execute the instruction and determine the target terminal according to the first guide information is executing the instruction, and determining, according to at least the first guide information and forte information of users corresponding to terminals that are within same base-station signal coverage in which the alarm terminal is located, the target terminal among the terminals that are within the same base-station signal coverage in which the alarm terminal is located; or, executing the instruction, and determining, according to at least the first guide information and forte information of users corresponding to terminals whose distances from the alarm terminal are less than the threshold, the target terminal among the terminals whose distances from the alarm terminal are less than the threshold.

Preferably, in this embodiment of the present invention, the first guide information further includes navigation information between the target terminal and the alarm terminal.

Figure 8:
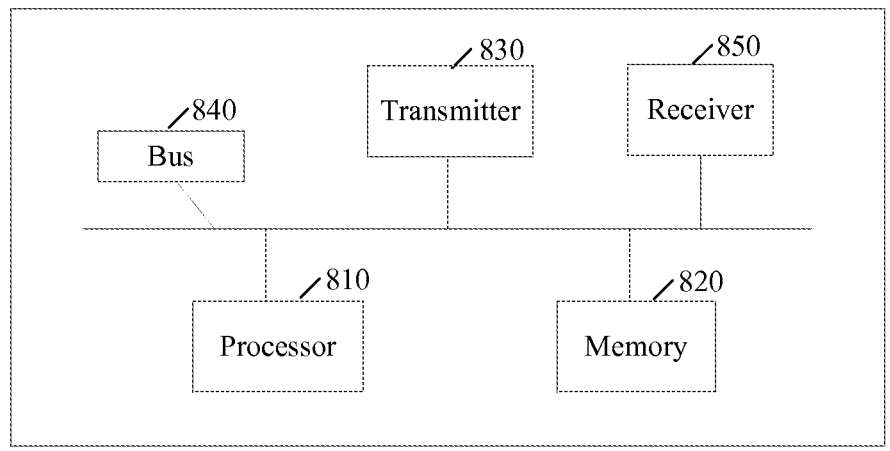
FIG. 8 is another schematic structural diagram of a network device according to an embodiment of the present invention.

Referring to FIG. 8, based on a same inventive concept, an embodiment of the present invention provides a network device. The network device may be the first network device described above. The network device includes a bus 840, a processor 810 connected to the bus 840, a memory 820, a transmitter 830, and a receiver 850. The memory 820 is configured to store an instruction. The receiver 850 is configured to receive alarm information sent by an alarm terminal. The processor 810 is configured to execute the instruction, and after confirming the alarm information, generate the first guide information according to the alarm information. The transmitter 830 is configured to send the first guide information to a second network device, and send, using the second network device, to a target terminal second guide information that relates to the first guide information, where the target terminal is a terminal that is determined, by the second network device according to location information of the alarm terminal and the second guide information, among terminals that are within same base-station signal coverage in which the alarm terminal is located, or, a terminal that is determined, by the second network device according to location information of the alarm terminal and the second guide information, among terminals whose distances from the alarm terminal are less than the threshold.

Preferably, in this embodiment of the present invention, the second guide information is information generated by the network device according to the first guide information, or the second guide information is the first guide information.

Figure 9:
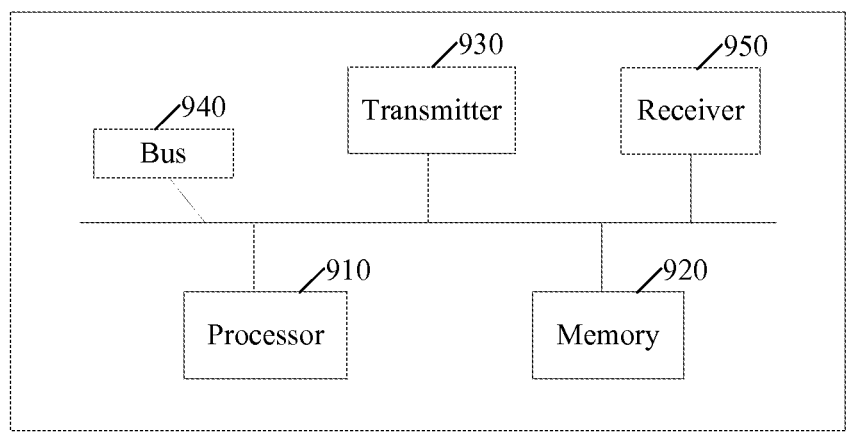
FIG. 9 is a schematic structural diagram of a terminal according to an embodiment of the present invention.

Referring to FIG. 9, based on a same inventive concept, an embodiment of the present invention provides a terminal, where the terminal may be the alarm terminal described above. The terminal includes a bus 940, a processor 910 connected to the bus 940, a memory 920, a transmitter 930, and a receiver 950. The memory 920 is configured to store an instruction. The transmitter 930 is configured to send alarm information to a first network device; and send first guide information to a target terminal over a communications link with the target terminal, where the first guide information is generated by the terminal according to the alarm information, and the target terminal is a terminal selected from terminals that are within same base-station signal coverage in which the alarm terminal is located, or the target terminal is a terminal selected from terminals whose distances from the alarm terminal are less than a threshold. The receiver 950 is configured to receive second guide information sent by the first network device, where the second guide information is generated by the first network device according to the alarm information. The processor 910 is configured to execute the instruction and establish the communications link with the target terminal according to the second guide information.

Preferably, in this embodiment of the present invention, the processor 910 is configured to execute the instruction and establish a D2D communications link with the target terminal according to the second guide information; and the transmitter 930 is configured to send the first guide information to the target terminal over the D2D communications link with the target terminal.

Preferably, in this embodiment of the present invention, the second guide information includes time-frequency resource information.

The information sending method in the embodiments of the present invention may include receiving, by a first network device, alarm information sent by an alarm terminal; and after confirming the alarm information, generating, by the first network device, first guide information according to the alarm information, and sending the first guide information to a target terminal, so that the target terminal can respond to the alarm information according to the first guide information, where the target terminal is a terminal selected from terminals that are within same base-station signal coverage in which the alarm terminal is located, or the target terminal is a terminal selected from terminals whose distances from the alarm terminal are less than a threshold.

In the embodiments of the present invention, after receiving the alarm information, the first network device may generate the first guide information and send the first guide information to the target terminal. In this way, the target terminal may respond to the alarm information, and help rescue a user of the alarm terminal. Because the target terminal is a terminal selected from terminals that are within same base-station signal coverage in which the alarm terminal is located, or the target terminal is a terminal selected from terminals whose distances from the alarm terminal are less than a threshold, which means that a distance between the target terminal and the alarm terminal is relatively short, so that the target terminal can arrive at the site in time to rescue the user of the alarm terminal, thereby effectively improving rescue efficiency. The first network device automatically sends the first guide information to the target terminal, where there may be one or more target terminals, and the alarm terminal does not need to send the first guide information one by one; therefore, efficiency of information transmission is relatively high, and it is ensured to the greatest extent that the user of the alarm terminal can be rescued in time.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

In the foregoing descriptions, the foregoing embodiments are merely intended for describing the technical solutions of this application in detail; however, the descriptions of the foregoing embodiments are merely intended to help understand the method and idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. An information sending method comprising:
receiving, by a first network device, alarm information from an alarm terminal, wherein the alarm information comprises help-seeking information and location information of the alarm terminal;
determining, by the first network device, a target terminal according to forte information of users corresponding to terminals, wherein the target terminal is either a terminal of terminals that are within same base-station signal coverage in which the alarm terminal is located, or a terminal selected whose distances from the alarm terminal are less than a threshold, and wherein the forte information is rescuing capability of users corresponding to terminals;
determining, by the first network device, whether the alarm information is valid alarm information;
determining, by the first network device, according to information about the alarm terminal that is carried in the alarm information, whether the alarm terminal is an authorized terminal;
confirming, by the first network device, that detection of the alarm information is passed when the alarm information is valid alarm information and the alarm terminal is an authorized terminal;
generating, by the first network device, a first guide information according to the alarm information after confirming the alarm information, wherein the first guide information comprises navigation information between the target terminal and the alarm terminal; and
sending, by the first network device, the first guide information to the target terminal.

2. The method according to claim 1, wherein generating, by the first network device, the first guide information according to the alarm information comprises:
parsing, by the first network device, the alarm information;
determining, by the first network device, a meaning of the alarm information; and
generating, by the first network device, the corresponding first guide information according to the meaning of the alarm information.

3. The method according to claim 1, wherein generating, by the first network device, the first guide information according to the alarm information comprises:
   requesting, by the first network device, according to the location information of the alarm terminal that is carried in the alarm information, location information of the alarm terminal from a second network device;
   receiving, by the first network device, the location information of the alarm terminal that is fed back by the second network device;
   generating, by the first network device, the first guide information according to the alarm information and the location information of the alarm terminal, wherein either the location information of the alarm terminal is obtained by the second network device by an Assisted Global Positioning System (AGPS), or the location information of the alarm terminal is obtained by the second network device in a time of arrival (TOA) manner; and
   sending, by the first network device, the first guide information to the second network device.

4. An information sending method comprising:
   sending, by an alarm terminal, alarm information to a first network device, wherein the alarm information comprises help-seeking information and location information of the alarm terminal, and wherein the first network device confirms that detection of the alarm information is passed when the alarm information is valid alarm information and the alarm terminal is an authorized terminal;
   receiving, by the alarm terminal, a second guide information from the first network device, wherein the second guide information is generated by the first network device according to the alarm information, wherein a target terminal is determined, by the first network device, according to forte information of users corresponding to terminals, wherein the target terminal is either a terminal of terminals that are within same base-station signal coverage in which the alarm terminal is located, or a terminal selected whose distances from the alarm terminal are less than a threshold, and wherein the forte information is rescuing capability of users corresponding to terminals;
   establishing, by the alarm terminal, a communications link with the target terminal according to the second guide information; and
   sending, by the alarm terminal, a first guide information to the target terminal over the communications link with the target terminal, wherein the first guide information is generated by the alarm terminal according to the alarm information.

5. The method according to claim 4, wherein establishing, by the alarm terminal, the communications link with the target terminal according to the second guide information comprises establishing, by the alarm terminal, a device-to-device (D2D) communications link with the target terminal according to the second guide information, and wherein sending, by the alarm terminal, the first guide information to the target terminal over the communications link with the target terminal comprises sending, by the alarm terminal, the first guide information to the target terminal over the D2D communications link with the target terminal.

6. A network device comprising:
   a receiver configured to receive alarm information from an alarm terminal, wherein the alarm information comprises help-seeking information and location information of the alarm terminal; and
   a processor coupled to the receiver and configured to:
      determine a target terminal according to forte information of users corresponding to terminals, wherein the target terminal is either a terminal of terminals that are within same base-station signal coverage in which the alarm terminal is located, or a terminal selected whose distances from the alarm terminal are less than a threshold, and wherein the forte information is rescuing capability of users corresponding to terminals;
      determine whether the alarm information is valid alarm information;
      determine, according to information about the alarm terminal that is carried in the alarm information, whether the alarm terminal is an authorized terminal;
      confirm that detection of the alarm information is passed when the alarm information is valid alarm information and the alarm terminal is an authorized terminal;
      generate a first guide information according to the alarm information after confirming the alarm information, wherein the first guide information comprises navigation information between the target terminal and the alarm terminal; and
      send the first guide information to the target terminal, wherein either the target terminal is a terminal selected from terminals that are within same base-station signal coverage in which the alarm terminal is located, or the target terminal is a terminal selected from terminals whose distances from the alarm terminal are less than a threshold.

7. The network device according to claim 6, wherein the receiver is further configured to receive location information of the alarm terminal that is from the alarm terminal, wherein the location information of the alarm terminal is obtained by the alarm terminal from an Assisted Global Positioning System/Global Positioning System (AGPS/GPS), and wherein the processor is further configured to:
   generate the first guide information according to the alarm information; and
   send the first guide information to the target terminal, wherein either the target terminal is a terminal that is determined, according to the location information of the alarm terminal and the first guide information, among terminals that are within same base-station signal coverage in which the alarm terminal is located, or a terminal that is determined, according to the location information of the alarm terminal and the first guide information, among terminals whose distances from the alarm terminal are less than the threshold.

8. The network device according to claim 6, wherein the processor being configured to generate the first guide information according to the alarm information comprises the processor being configured to:
   parse the alarm information;
   determine a meaning of the alarm information; and
   generate the corresponding first guide information according to the meaning of the alarm information.

9. The network device according to claim 6, wherein the processor is further configured to:
   request, according to the location information of the alarm terminal that is carried in the alarm information, location information of the alarm terminal from a second network device;
   receive the location information of the alarm terminal that is fed back by the second network device;

generate the first guide information according to the alarm information and the location information of the alarm terminal, wherein either the location information of the alarm terminal is obtained by the second network device by means of an Assisted Global Positioning System (AGPS), or the location information of the alarm terminal is obtained by the second network device in a time of arrival (TOA) manner; and send the first guide information to the second network device.

10. An alarm terminal comprising:

a transmitter configured to:

send alarm information to a first network device, wherein the alarm information comprises help-seeking information and location information of the alarm terminal, and wherein the first network device confirms that detection of the alarm information is passed when the alarm information is valid alarm information and the alarm terminal is an authorized terminal; and send a first guide information to a target terminal over a communications link with the target terminal, wherein the first guide information comprises navigation information between a target terminal and the alarm terminal, wherein the first guide information is generated by the alarm terminal according to the alarm information, and wherein the target terminal is determined, by the first network device, according to forte information of users corresponding to terminals, wherein the target terminal is either a terminal of terminals that are within same base-station signal coverage in which the alarm terminal is located, or a terminal selected whose distances from the alarm terminal are less than a threshold, and wherein the forte information is rescuing capability of users corresponding to terminals;

a receiver configured to receive a second guide information from the first network device, wherein the second guide information is generated by the first network device according to the alarm information; and a processor coupled to the transmitter and the receiver and configured to establish the communications link with the target terminal according to the second guide information.

11. The alarm terminal according to claim 10, wherein the processor is configured to establish a device-to-device (D2D) communications link with the target terminal according to the second guide information, and wherein the transmitter is configured to send the first guide information to the target terminal over the D2D communications link with the target terminal.

\* \* \* \* \*